(12) United States Patent
Lim

(10) Patent No.: US 7,554,584 B2
(45) Date of Patent: Jun. 30, 2009

(54) METHOD AND CIRCUIT FOR PERFORMING CORRELATED DOUBLE SUB-SAMPLING (CDSS) OF PIXELS IN AN ACTIVE PIXEL SENSOR (APS) ARRAY

(75) Inventor: Suhun Lim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 677 days.

(21) Appl. No.: 11/068,205

(22) Filed: Feb. 28, 2005

(65) Prior Publication Data

US 2005/0206752 A1    Sep. 22, 2005

(30) Foreign Application Priority Data

Mar. 16, 2004    (KR) .................. 10-2004-0017675

(51) Int. Cl.
*H04N 5/217* (2006.01)
(52) U.S. Cl. ..................................... 348/241
(58) Field of Classification Search ........... 348/241, 348/294; 341/155; 382/103; 711/217; 250/208.1
See application file for complete search history.

(56) References Cited

U.S. PATENT DOCUMENTS

| | | | | |
|---|---|---|---|---|
| 5,272,481 | A * | 12/1993 | Sauer ........................ | 341/165 |
| 5,448,056 | A * | 9/1995 | Tsuruta .................. | 250/214 A |
| 5,892,540 | A * | 4/1999 | Kozlowski et al. ......... | 348/300 |
| 6,067,113 | A * | 5/2000 | Hurwitz et al. ............ | 348/241 |
| 6,424,375 | B1 * | 7/2002 | Fowler ...................... | 348/241 |
| 6,476,864 | B1 * | 11/2002 | Borg et al. ................. | 348/245 |
| 6,501,411 | B2 * | 12/2002 | Soundarapandian et al. | 341/161 |
| 6,753,912 | B1 * | 6/2004 | Wayne ....................... | 348/241 |
| 6,839,452 | B1 * | 1/2005 | Yang et al. .................. | 382/103 |
| 6,856,350 | B2 * | 2/2005 | Orava et al. ................. | 348/308 |
| 6,885,396 | B1 * | 4/2005 | Panicacci et al. ............ | 348/241 |
| 6,895,256 | B2 * | 5/2005 | Harma et al. ............. | 455/556.1 |
| 6,995,879 | B2 * | 2/2006 | Sugiyama et al. ........... | 358/482 |
| 7,230,558 | B2 * | 6/2007 | Lim ........................... | 341/155 |

(Continued)

FOREIGN PATENT DOCUMENTS

EP    1 253 776 A2    10/2002

(Continued)

OTHER PUBLICATIONS

European Search Report.

*Primary Examiner*—Tuan V Ho
*Assistant Examiner*—Kent Wang
(74) *Attorney, Agent, or Firm*—F. Chau & Associates, LLC

(57) ABSTRACT

A method and circuit for performing Correlated Double Sub-Sampling (CDSS) of pixels in an active pixel sensor (APS) array. The method and the apparatus subsamples a plurality ($L^2$) of pixels by: storing $L^2$ analog reset charges output from the $L^2$ pixels into a first set of ($N^2$) storage capacitors, and combining the ($L^2$) reset charges; storing $L^2$ analog image signal charges output from the $L^2$ pixels into a second set of ($N^2$) storage capacitors, and combining the ($L^2$) image charges; and then obtaining a differential voltage (VS-VR) by subtracting (in the analog-domain) the voltage (VR) represented by the combined ($L^2$) reset charges from the voltage (VS) represented by the combined ($L^2$) image signal charges. When L equals one, the circuit performs conventional Correlated Double Sampling CDS upon the one pixel.

46 Claims, 11 Drawing Sheets

U.S. PATENT DOCUMENTS

| | | | |
|---|---|---|---|
| 7,268,331 B2 * | 9/2007 | Koyama | 250/208.1 |
| 7,268,815 B1 * | 9/2007 | Meynants | 348/294 |
| 2002/0158982 A1 * | 10/2002 | Kokubun et al. | |
| 2005/0103977 A1 * | 5/2005 | Krymski | 250/208.1 |

FOREIGN PATENT DOCUMENTS

| | | |
|---|---|---|
| EP | 1 271 930 A2 | 1/2003 |
| EP | 1 484 912 A2 | 12/2004 |

* cited by examiner

METHOD AND CIRCUIT FOR PERFORMING CORRELATED DOUBLE SUB-SAMPLING (CDSS) OF PIXELS IN AN ACTIVE PIXEL SENSOR (APS) ARRAY

FIELD OF THE INVENTION

The present invention relates to image sensors, more particularly to a method and circuit able to perform Correlated Double Sub-Sampling (sub-sampling and then correlated double sampling (CDS)) of a dynamically selected number of pixels in an N×M pixel region of an active pixel sensor (APS) Array.

DISCUSSION OF RELATED ART

Since the mid 1980's, the most common image pickup device (image sensor) has been the charge coupled device (CCD). Backed by the semiconductor industry, CCD capabilities advanced rapidly, eventually resulting in the present small high-performance cameras. While, the charge coupled device CCD was virtually the principal image pickup device, the core of digital cameras, the CCD sensor is disadvantageous in that it consumes comparatively high amounts of energy and does not sustain high-speed operation. In view of this situation, large CMOS image sensors (CIS), which offer a high resolution of multiple megapixels (Mps), have been developed. In addition to its capabilities to allow the placement of a very great number of pixels at a high density and data scanning at a high speed, the CMOS image sensor (CIS) consumes less power (approximately ⅕ of the power consumed by existing CCD chips), which is a marked advantage over the standard CCDs in use today. Another advantage is the CMOS sensor's lower manufacturing cost: even a relatively large-size CMOS sensor can be offered at a very low cost. A CMOS image sensor can be manufactured by the same process, or on the same chip, as a MOSFET or CMOS transistor, so that signal processing circuits can be formed on the same chip, thus reducing interconnection wiring. Furthermore, the CMOS sensor requires less driving voltage than the CCD, and it can be advantageously downsized, as peripheral circuits can be mounted on-chip. So, the CMOS sensor is expected to be the key image sensing device (a substitute for the CCD solid-state image pickup devices) in future digital imaging systems in a wide range of applications.

There is a large difference in the image data-scanning method between CCD and CMOS sensors. Supposing a resolution of 3 megapixels, for instance, a CCD sensor scans the three million (analog) charges consecutively, in the same way as passing a bucket from one person to another, and amplification (converting charges to electrical signals) generally occurs only after the last pixel element is scanned. On the other hand, a CMOS sensor e.g., an active pixel sensor (APS) Array (see APS Array of FIG. 1) is provided with one amplifier per pixel (here, an amplifier means a transistor or other converter to change charges into electrical signals). Therefore, it can perform signal amplification on a per-pixel basis, reducing transfer operations and, consequently, scans data more rapidly with less energy consumption.

Correlated Double Sampling (CDS)

The CMOS image sensor's charge-to-voltage converter is basically a capacitor with a single (or multistage) voltage follower (amplifying transistor), and a switch to preset ("reset") the capacitor voltage to a "known" initial level. In simplest video systems the switch is closed in the beginning of each pixel readout, and that resets the capacitor voltage as well as the output level. After the pixel charge packet is transferred to the capacitor its voltage changes and the output signal represents the pixel value. Components, such as the switch, due to its finite residual conductivity, can precharge the capacitor to an unknown value, and this adds error to the output signal. Fortunately there is a method to compensate for this precharge uncertainty—correlated double sampling (CDS). In this method the output signal is sampled twice for each pixel—just after precharging capacitor and after the pixel charge packet is added. The difference between these two values excludes the noise component (charge) induced by the switch.

Correlated Double Sampling, or CDS, is a method employed to improve the signal to noise ratio (S/N) of integrating image sensors. By subtracting a pixel's "dark" or "reference" or "reset" output (charge) level from the actual light-induced signal, static fixed pattern noise (FPN) and several types of temporal noise are effectively removed from the sensor's (APS Array) output.

In an optical sensor (APS) array the photocharge is generally collected by a PhotoDiode (PD) and may be stored on a capacitance C within each pixel element. The photo charge is read from the capacitance as the voltage of that capacitance (V=Q/C). With the CDS procedure the signal voltage Vs=Qs/C is compared with the "dark", "empty", "reference" or "reset" level voltage Vr=Qr/C that is obtained (e.g., previously) when all charges of C have been channeled off to a fixed potential. Thus for each pixel the final output voltage V=Vs−Vr=(Qs−Qr)/C is obtained. The CDS procedure can be performed "on chip" with circuits fabricated on the same chip as the active pixel sensor (APS) Array (see APS Array of FIG. 1) or by "off-chip CDS". The CDS procedure generally requires a memory (e.g. one charge-storage capacitor) and one subtractor for each column of pixels to be CDS-sampled.

FIG. 2 includes two identical circuits ("a" and "b"), each circuit being connected, for CDS-sampling of pixels from one of two columns (e.g., column "1" or column "3"), through a respective vertical selection line ("CL1" of "CL3") via a sample-holding switch 42 (42a or 42b). A sample-holding capacitance 44, for holding the reset or signal charge outputted from a pixel in the APS array is interruptably connected to a vertical selection line by the sample-holding switch 42. A reference voltage source 46 (e.g., 46a and 46b) is connected in series to the sample-holding capacitance 44. An analog (charge) subtractor is comprised of a sample-holding capacitance 44 (44a or 44b), an amplifier (e.g., non-inverting buffer) 48 (48a or 48b) and a capacitance 50 (50a or 50b). An output node of the subtractor (a terminal of the capacitance 50) is connected to an input terminal of an output amplifier 54. The charge held on the sample-holding capacitance 44 can be replicated in (copied to) capacitance 50 by closing the clamp switch 52, because a voltage output of the non-inverting buffer (amplifier) 48 corresponding to the electric charge quantity stored by sample-holding capacitance 44 can induce an equal voltage (and equal charge) to be stored in the capacitance 50. The capacitance 50 can thereafter be made to have a floating state (that stores the voltage/charge copied from sample-holding capacitance 44) by opening the clamp switch 52.

Thus, a first charge (e.g., "signal" charge Qs) from a given pixel that is initially received by and held by the sample-holding capacitance 44 can be copied to and stored in the capacitance 50, and so then later a second charge (e.g., the "reset" charge Qr) from the same pixel, can be received by and held by the sample-holding capacitance 44.

Thus, in operation, the signal voltage VS (from a pixel vertical via a selection line e.g., CL1) is first applied to the input terminal of the subtractor (a node of sample-holding capacitance 44) and, since the clamp switch 52 is closed (in the ON state), the signal voltage VS from the pixel charges the sample-holding capacitance 44 and also charges the capacitance 50. Next, after the clamp switch 52 is opened (turned OFF), and the reset potential (voltage) VR is outputted (from the same pixel, via a vertical selection line, e.g., CL1) so that the reset voltage VR is inputted to the input terminal of the analog subtractor and is held by the sample-holding capacitance 44. As a result, a difference signal (VS−VR) corresponding to a difference between the signal voltage VS and the reset voltage VR is generated at the output terminal of the analog subtractor (at a terminal of the capacitance 50). Thus it is possible to obtain the CDS-sampled analog pixel data of one pixel in which the fixed pattern noise component, which is superimposed on both the signal voltage VS and the reset voltage VR, is removed. The CDS-sampled analog pixel data may be outputted via the common output line 30 via amplifier 54 through switch 20 when switch 20 is closed.

In practice, the capacitance 50 (e.g., 50a, 51a, 50b, 51b) may only store a voltage associated with one charge from a given pixel (e.g., the first charge received from the pixel, e.g., one of either the "reset" charge Qr, or the "signal" charge (Qs)) rather than the entire difference signal (VS−VR) associated with Qs−Qr.

Thus, even if the image "signal" charge Qs (rather than the "reset" charge Qr) of each of four pixels is first stored in one of CDS capacitances 50a, 51a, 50b, 51b before the "reset" charges Qr of the four pixels is received by and held by one of the two sample-holding capacitances 44 (44a, 44b), the resulting output (of either subtractor) as seen by amplifier 54 (e.g., 54a or 54b) will be based upon only two "reset" charges (stored in the two sample-holding capacitances 44) received from two of the four pixels. Thus, the resulting output of the subtractor (as seen by amplifier 54) will NOT be a mathematical "average" of the four CDS-sampled pixel values (VS−VR) that are sequentially obtainable to be output from the circuit of FIG. 2.

Thus, some operations of the circuit of FIG. 2 may be capable of distributing errors arising from a fixed pattern noise component (e.g., in one or in two of the four pixels) to four pixels (averaged together), instead of entirely removing such errors from the averaged pixel value supposed to represent the four pixels.

The ability to subsample an image captured in a digital camera by an array of pixels can be useful where reduced resolution is beneficial, such as to reduce bit rate in a moving image (video) capture mode, or to enable the display of an image on a reduced resolution display. Subsampling in the digital domain (after analog-to-digital conversion) generally requires a large capacity of memory and processing time which consumes additional electrical power.

The circuit of FIG. 2 and other closely related known circuits for performing pixel sub-sampling by the analog-domain "averaging" operations of FIG. 2 are only adapted to perform sub-sampling of CDS-sampled pixels in Bayer-pattern array, by "averaging" together four pixels of each color in a 4×4 pixel region).

SUMMARY OF THE INVENTION

Exemplary embodiments of the invention provides an image sensor comprising a plurality of pixels arranged in rows and columns, each column of pixels being switchably attached to at least two reset data capacitors for storing at least two reset charges and at least two image data capacitors for storing at least two image charges.

The image sensor performs a method of subsampling $N^2$ pixels arrayed in N columns and N rows of an active pixel sensor (APS) array, each pixel being adapted to output a reset voltage and an image signal voltage, the method comprising the steps of: storing a first pixel's reset voltage as a first charge in a first capacitor; storing a second pixel's reset voltage as a second charge in a second capacitor; and combining the first and second charges into an averaged reset charge.

The method of subsampling pixels comprises: storing in a first set of $N^2$ capacitors the $L^2$ analog pixel reset data charges received from $L^2$ pixels in the APS array; storing in a second set of $N^2$ capacitors the $L^2$ analog pixel image signal data charges received from $L^2$ pixels in the APS array. L may range from one to N. A first averaging operation is performed upon the $L^2$ the analog pixel reset data charges stored in the first set of $N^2$ capacitors. A second averaging operation upon the $L^2$ the analog pixel image signal data charges stored in the second set of $N^2$ capacitors is also performed.

The image sensor includes an averaging and comparing unit (ACU) connected to each column of pixels. The ACUs work together to carry out averaging operations in the analog domain, and for subtracting (also in the analog domain) the averaged reset charges (from a plurality of pixels) from the averaged signal charges (from the same plurality of pixels) to generate a differential voltage. The image sensor will also include an analog to digital converter (ADC) for carrying out analog to digital conversion of the differential voltage.

Another embodiment of the present invention provides a method of subsampling (with subsampling ration $1:L^2$) an array of pixels arranged in a plurality of rows and a plurality of columns, each pixel being adapted to output a reset voltage and an image signal voltage, the method comprising the steps of: combining together a plurality ($L^2$) of analog reset data charges output from a plurality ($L^2$) of pixels (e.g., combining $L^2$ reset charges stored in a first set of storage capacitors); and combining together a plurality ($L^2$) of analog image signal data charges output from the plurality ($L^2$) of pixels (e.g., combining $L^2$ image signal charges stored in a second set of storage capacitors). A Correlated Double Sampling (CDS) operation (e.g., known to the related art) is performed using combined (averaged) reset data charges and the combined image signal data charges (instead of reset and image charges from a single pixel), to obtain a differential voltage (VS−VR) representing the precise mathematical "average" of averaging $L^2$ pixels of the same color.

The preciseness of the "averaging" (and sub-sampling) function performed by exemplary embodiments of the invention is verified by the observation that the mathematical "average" of four CDS-sampled pixel values (charges quantified as Qs−Qr) representing one color within a 4×4 pixel region in Bayer-pattern array (assuming all capacitors in subtractors have equal capacitance C and are charged while connected to same Vref) is represented by the following relationship (equations):

$$Q_{AVG} = \frac{1}{4}((Q_{S11} - Q_{R11}) + (Q_{S13} - Q_{R13}) + (Q_{S31} - Q_{R31}) + (Q_{S33} - Q_{R33}))$$

and, by the Distributive and Additive Inverse properties of addition:

$$Q_{AVG} = \frac{1}{4}(Q_{S11} + Q_{S13} + Q_{S31} + Q_{S33}) - \frac{1}{4}(Q_{R11} + Q_{R13} + Q_{R31} + Q_{R33})$$

It follows from this mathematical relationship that the precise "average" value of four CDS-sampled pixel values to be averaged together (subsampled) can be obtained by (analog) subtraction of a combination of the four "reset" charges ($Q_{R11}+Q_{R13}+Q_{R31}+Q_{R33}$ of the four pixels) from a combination of the four "signal" charges $Q_{S11}+Q_{S13}+Q_{S31}+Q_{S33}$ of the four pixels. The combination of the four "signal" charges can be "divided" by four (e.g., prior to "subtracting" the combined "reset" charge) by distributing that combined charge (e.g., equally) between four capacitors of equal capacitance (e.g., C). Similarly, the combination of the four "reset" charges can then be "divided" by four (e.g., prior to "subtraction" from the combined "signal" charges) by distributing that combined charge (e.g., equally) between four capacitors of equal capacitance (e.g., C). Thus, the "average" value of four CDS-sampled pixels can be obtained by performing the steps of: combining and dividing (averaging, sub-sampling) the four associated "reset" charges to obtain an averaged reset charge $Q_{RAVG}$; combining and dividing (averaging, subsampling) the four associated "signal" charges to obtain an averaged signal charge $Q_{SAVG}$; and then performing one correlated double sampling operation (a subtraction) by subtracting the averaged reset charge $Q_{RAVG}$ from the averaged signal charge $Q_{SAVG}$. This general method is herein referred to as correlated double sub-sampling (CDSS) because the result of the method is a precisely sub-sampled pixel value representing the mathematical average of four CDS-sampled pixels. Instead of performing four CDS subtractions as in the related art, only one CDS subtraction operation need be performed, upon the "averaged" (subsampled) "reset" and "signal" charges. Thus, subsampling is precisely performed prior to final CDS subtraction.

In exemplary embodiments of the invention, correlated double sub-sampling CDSS, with a subsampling ratio B (an integer raised to the power of 2: e.g., 4, 9, 16, 25 ... ) where B equals four, may be performed in three stages: In the first stage, two pairs of Reset voltages (charges) are averaged in the column direction and two pairs of Signal voltages (charges) are averaged in the column direction; in the second stage, the final (averaged) Reset voltage is obtained by averaging the two averaged pairs of Reset voltages, in the row direction, and the final (averaged) Image (Signal) voltage is obtained by averaging the two averaged pairs of Image (Signal) voltages, in the row direction; in the third stage, analog subtraction of the final (averaged) Reset voltage from the final (averaged) Image (Signal) voltage is performed (e.g., by using a single analog subtractor). In the exemplary embodiments herein, "averaging" of charges includes combining charges stored on four capacitances C into one larger effective capacitance (e.g., 4C), and also includes dividing the combined charges between an appropriate number (e.g., same number) of equal capacitances (e.g., C).

Another exemplary embodiment of the present invention provides an image sensor (e.g., CIS) comprising an array of pixels arranged in a plurality of rows and a plurality of columns, each pixel in each column of pixels being operatively connected to an averaging unit, wherein each averaging unit includes a first and second storage capacitors for storing analog reset data from a first pixel and from a second pixel and third and fourth storage capacitors for storing analog image signal data from the first pixel and from the second pixel.

BRIEF DESCRIPTION OF THE DRAWINGS

The features of the present invention will become understood by those having ordinary skill in the art by describing, in detail, exemplary embodiments thereof with reference to the attached drawings, wherein like elements are represented by like reference numerals.

DETAILED DESCRIPTION OF THE EXEMPLARY EMBODIMENTS

Figure 1:
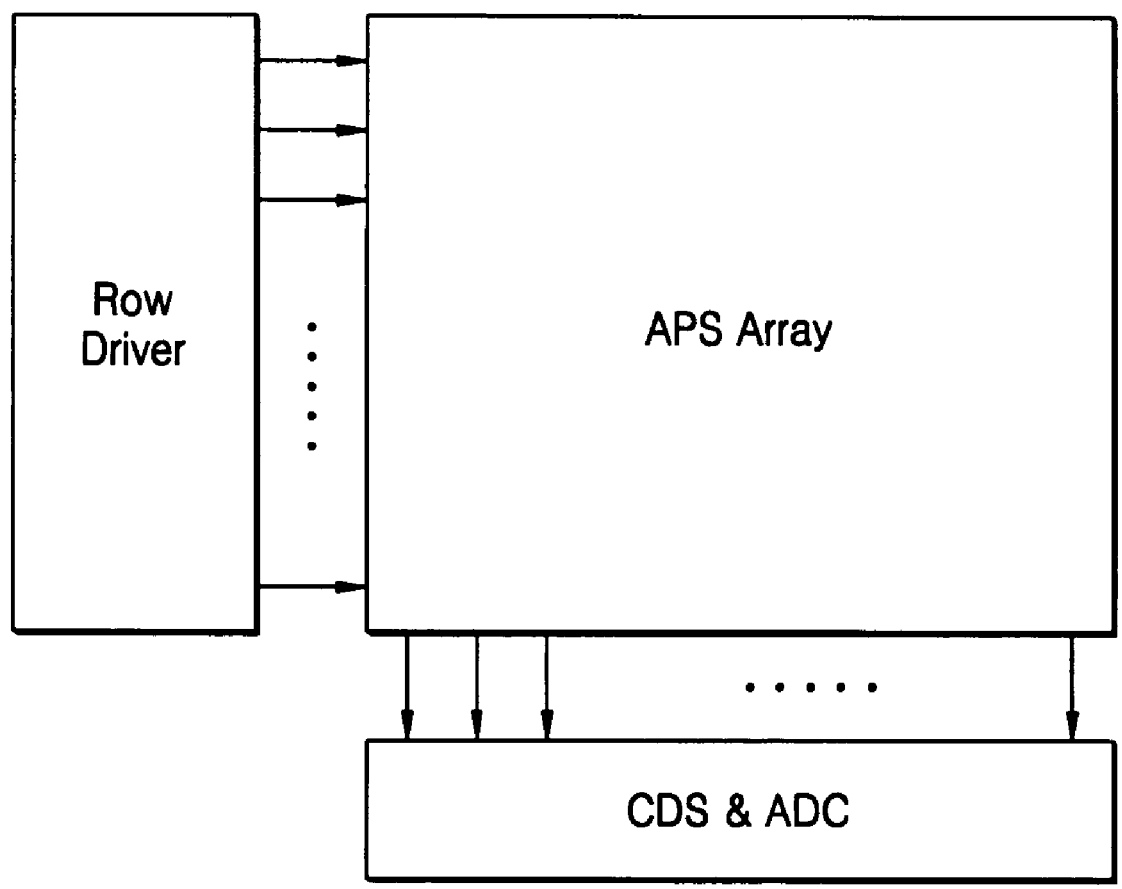
FIG. 1 is a block diagram illustrating a CMOS image sensor (CIS) of the related art including an active pixel (APS) array.
Figure 2:
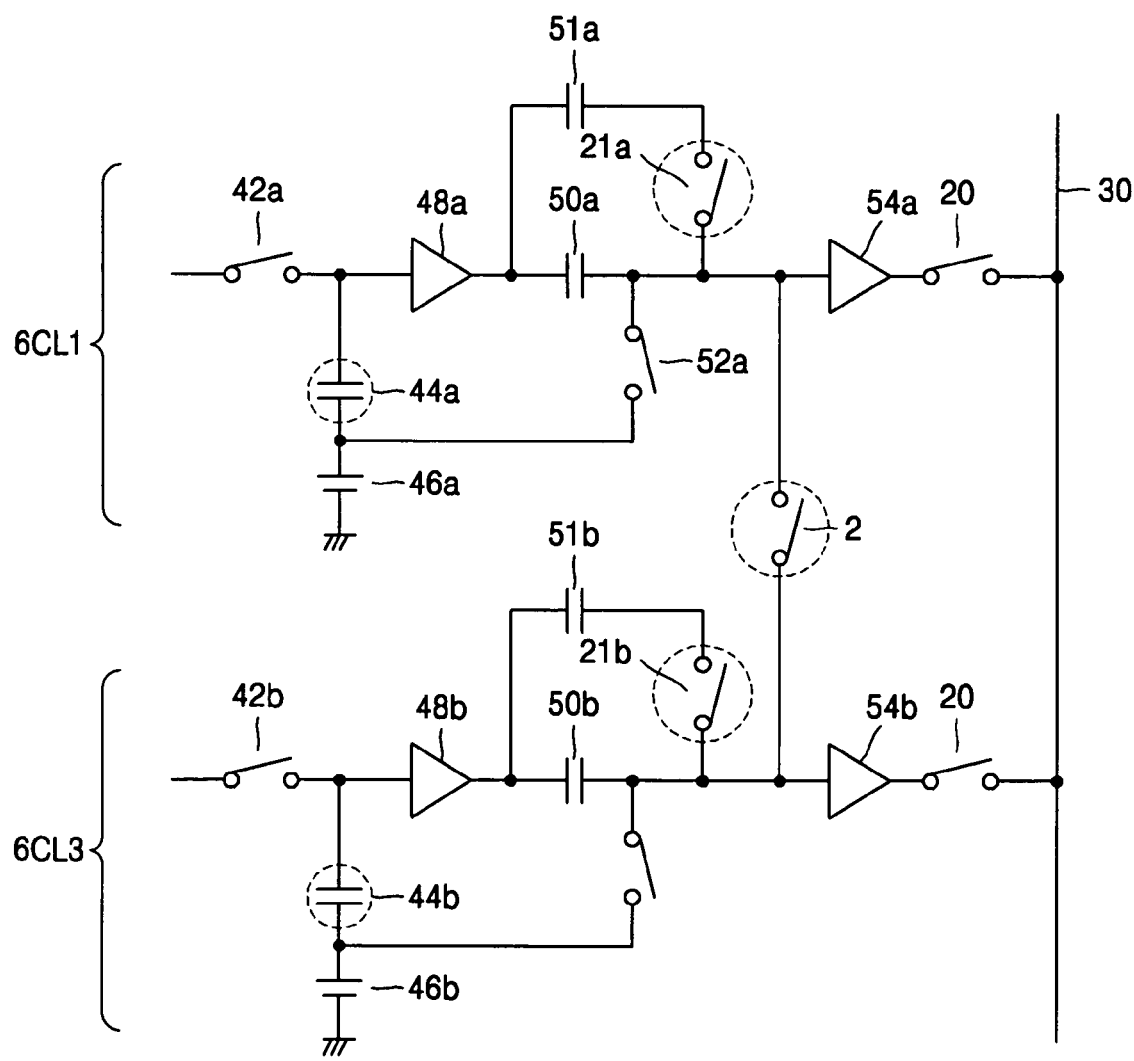
FIG. 2 is a block diagram illustrating a Correlated Double Sampling (CDS) circuit of the related art adapted to approximately average four pixels of the same color.
Figure 3:
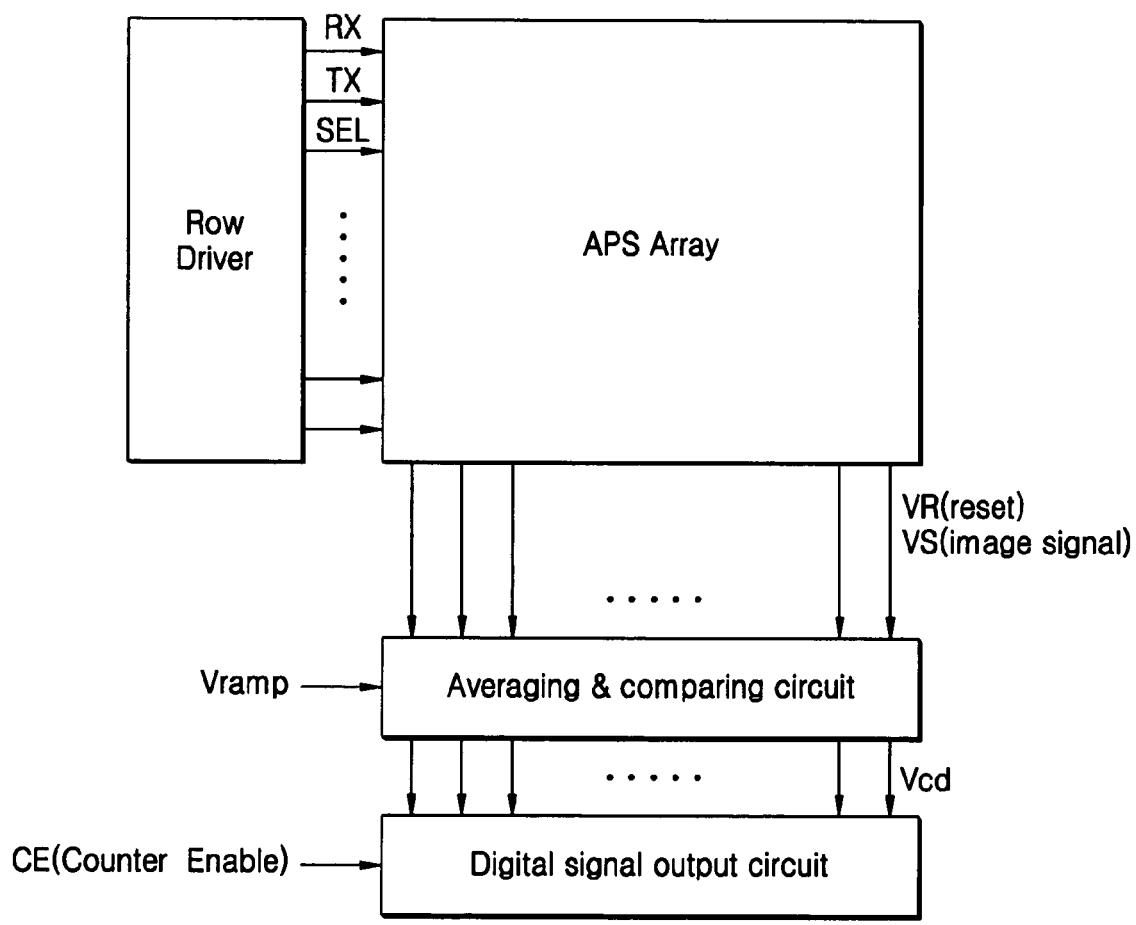
FIG. 3 is a block diagram illustrating a CMOS image sensor (CIS), including an active pixel sensor (APS) array, and an Averaging & Comparing circuit for performing Correlated Double Sub-Sampling (CDSS), according to an exemplary embodiment of the present invention.
Figure 4:
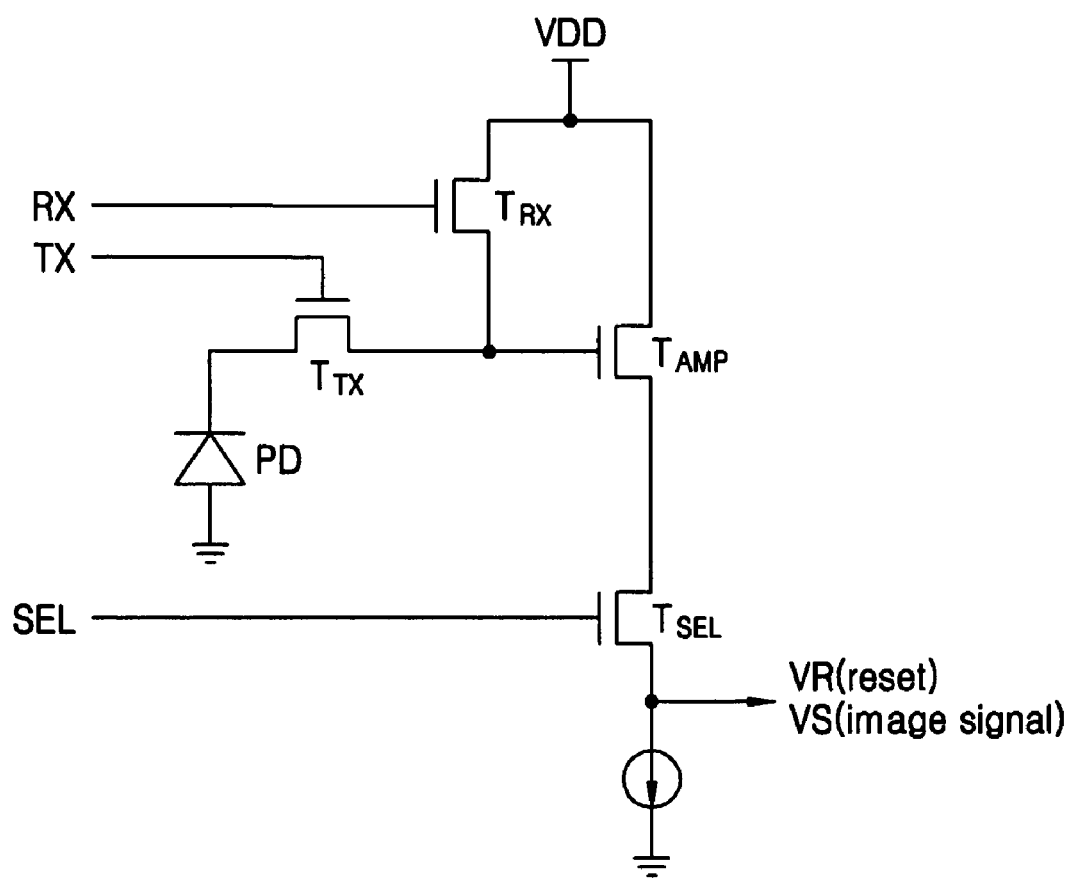
FIG. 4 is a circuit diagram illustrating an exemplary structure of each pixel in the active pixel sensor (APS) array of the CIS unit of FIG. 3.

FIG. 3 is a block diagram illustrating a CMOS image sensor (CIS) unit, including an active pixel sensor (APS) array, and an Averaging & Comparing circuit for performing Correlated Double Sub-Sampling (CDSS), according to an exemplary embodiment of the present invention. FIG. 4 is a circuit diagram illustrating an exemplary structure of each pixel within the active pixel sensor (APS) array of the CIS of FIG. 3.

Referring to FIG. 3 and FIG. 4, the active pixel sensor (APS) array may be comprised of a plurality of pixel circuits known in the related art, or preferably, the pixel circuit of FIG. 4, adapted to sequentially output a VR(reset) voltage and a VS(image signal) voltage. Each pixel in the APS array will generally include a photo-electric transducer (e.g., photodiode PD of FIG. 4). The Row Driver circuit is generally known in the related art and is adapted here to sequentially select pairs of odd (1,3 . . . ) and then pairs of even (2,4 . . . ) numbered rows during Correlated Double Sub-Sampling (CDSS), according to an exemplary embodiment of the present invention. Specifically, one of the plurality of lines provided to transmit the active Row SELect signal SEL is used to select (activate) the active row.

The switch $T_{TX}$ controlled by signal TX is closed when the charge/voltage stored in a capacitance associated with the pixel's photodiode PD is to be read out. Switch $T_{TX}$ is generally open during a reset operation. $T_{TX}$ is closed together with reset switch $T_{RX}$, so that the diffusion area of the pixel's photodiode PD also can be reset. Reset signal RX is recognizable to persons skilled in the art as for controlling a switch $T_{RX}$, used in conjunction with the switch $T_{TX}$ controlled by signal TX, to preset ("reset") the charge/voltage stored in a capacitance associated with the photodiode PD, to a "reset" level.

Transistor $T_{AMP}$ is a "voltage follower" amplifier for changing the charge/voltage stored in the capacitance associated with the photodiode PD into a corresponding voltage/current sufficient to be transmitted to and stored in capacitor(s) in the Averaging & Comparing circuit (see FIG. 3 and FIG. 4).

The switch $T_{RX}$ controlled by reset signal RX is closed in the beginning of each pixel readout, and that closure resets capacitance charge/voltage associated with the PD. The "reset" charge/voltage of the capacitance associated with the photodiode PD provides the output voltage level VR at output node OUT (while switch $T_{SEL}$ is closed). When the APS array is exposed to a real image (light), the photodiode and associated capacitance of each pixel in the array will develop an "image/signal" charge (voltage) corresponding to the intensity (luminosity) of light falling on that pixel (PD). When switch $T_{TX}$ is closed and switch $T_{RX}$ is open, the actual light-induced "image signal" will be "amplified" by amplifier $T_{AMP}$ and, when switch $T_{SEL}$ is closed, will be transmitted as "image signal" voltage VS to and stored in capacitor(s) in the Averaging & Comparing circuit (see FIG. 3 and FIG. 4).

Figure 5:
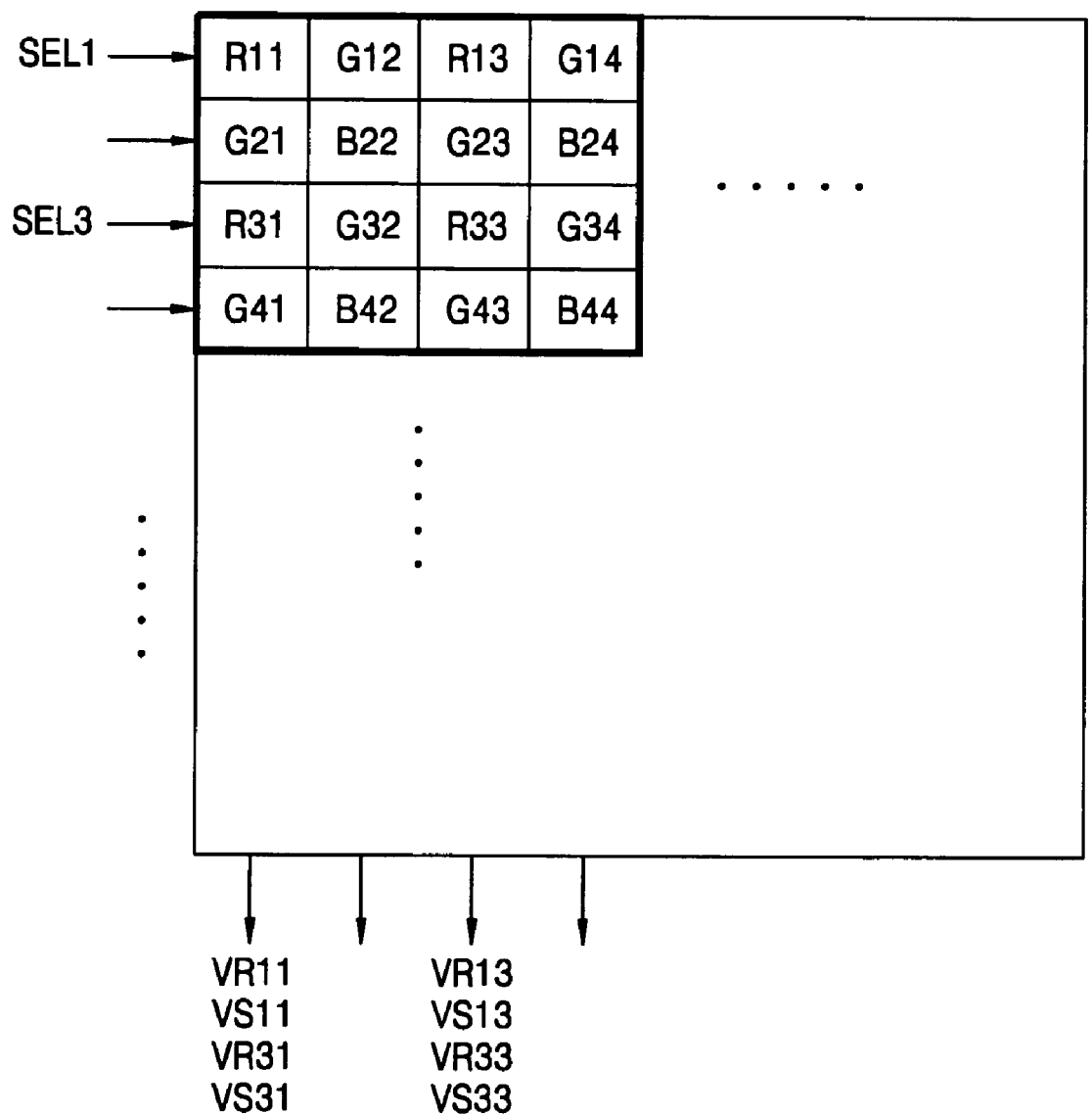
FIG. 5 is a block diagram illustrating the Bayer pattern arrangement of color sensing pixels in the active pixel sensor (APS) array of FIG. 3 and outputs thereof.

FIG. 5 is a block diagram illustrating the Bayer pattern arrangement of color sensing pixels in the active pixel sensor (APS) array of FIG. 3 and outputs thereof. The Bayer pattern may be implemented by a Bayer pattern color filter array (CFA) superimposed over the APS array's photodiodes (e.g., PD of FIG. 4). Exemplary embodiments of the present invention are adapted to "average" together (and Correlated Double Sub-Sample (CDSS)) sets of four pixels of the same color, for example Red pixels R11, R13, R31, R33 disposed in a 4×4 pixel region, e.g., the pixel region highlighted in FIG. 5. The sets of four pixels to be CDSS-sampled together will generally be comprised of pixels of the same color from the same two rows and same two columns, as in digital-domain subsampling of the related art. Thus, Red pixels R11, R13, R31, R33 will be CDSS-sampled together; Green pixels G12, G14, G32 and G34 will be (simultaneously) CDSS-sampled together. And then, Green pixels G21, G23, G41 and G43 will be CDSS-sampled together; and Blue pixels B22, B24, B42, B44 will be CDSS-sampled together. The result of such Correlated Double Sub-Sampling of the four sets (Red, Green, Blue, Green) of pixels of the same color, is four precisely "averaged" pixel values corresponding to Red, Blue, and Green pixels. Thus, performing Correlated Double Sub-Sampling upon a pixel region of an APS array effectively sub-samples the pixel region (in the analog domain) while also correcting for static fixed pattern noise (FPN) and several types of temporal noise.

The row selection signals SEL1 and SEL3, corresponding to rows 1 and 3 respectively, are sequentially activated. While each of the row selection signals is activated, all pixels in the active row first read out their respective "reset" voltages VR and then read out their actual "image signal" voltages VS. (See, e.g., timing diagram FIG. 8A) As noted in FIG. 5, the sequence of outputs from pixels in column 1 will include the signals from Red-filtered pixel R11 (VR11 and then VS11) and next from Red-filtered pixel R31 (VR31 and then VS31). Meanwhile, the sequence of outputs of pixels in column 3 will include the signals from Red-filtered pixel R13 (VR13 and then VS13) and next from Red-filtered pixel R33 (VR33 and then VS33). In alternative embodiments, the sequence of activating row 1 and row 3 can be reversed. Also, though not shown in FIG. 5 (but shown in FIG. 6), simultaneous outputs of pixels in column 2 will include the signals from Green-filtered pixel G12 (VR12 and then VS12) and next from Green-filtered pixel G32 (VR32 and then VS32); and, simultaneous outputs of pixels in column 4 will include the signals from Green-filtered pixel G14 (VR14 and then VS14) and next from Green-filtered pixel G34 (VR34 and then VS34). The values of pixels in rows 2 and 4 are not output until after all the values of pixels in rows 1 and 3 have been CDSS-sampled.

Figure 6:
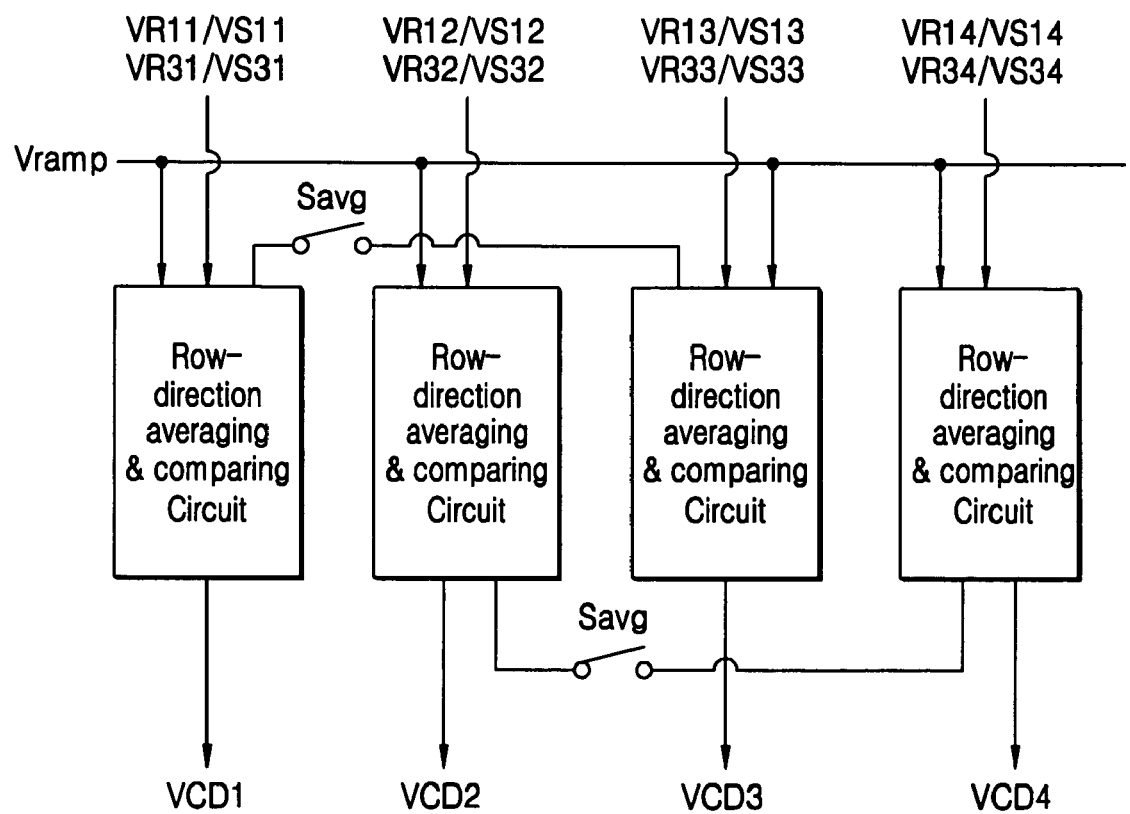
FIG. 6 is a block diagram illustrating the switching interconnections between a plurality of Averaging & Comparing Units (ACUs) for performing Correlated Double Sub-Sampling (CDSS) in the CMOS image sensor (CIS) of FIG. 3.

FIG. 6 is a block diagram illustrating the switching interconnections between a plurality of Averaging & Comparing units for performing Correlated Double Sub-Sampling (CDSS) in the CMOS image sensor (CIS) of FIG. 3. Each pixel in a column of the APS array is connected to a vertical transmission line (through its respective $T_{SEL}$ switch) and to one Averaging and Comparing Unit (ACU). Thus, the four adjacent Averaging and Comparing Units shown in FIG. 6 correspond to four adjacent columns (1, 2, 3, 4) of pixels in the APS array. Thus, at any time during a read-out operation, ACU-1 and ACU-3 are receiving analog pixel data received from same-color pixels (e.g., first from red-filtered pixels R11 and R13; and then from red-filtered pixels R31 and R33; and then green-filtered pixels G21 and G23; and then from green-filtered pixels G41 and G43). Thus, for effectively "averaging" (combining together in the analog domain) received analog pixel data pertaining to pixels of the same color, ACU-1 and ACU-3 are (switchably) connected to each other through a first averaging switch Savg. Similarly, ACU-2 and ACU-4 are (switchably) connected to each other through a second averaging switch Savg. The function of the "averaging" switch Savg will be explained in the discussion of the more detailed circuit diagram of FIG. 7 showing ACU-1 and ACU-3 in greater detail.

The structure and method of operation of Averaging & Comparing units (ACUs) in the in the CMOS image sensor (CIS) of FIG. 3 will now be described with reference to FIGS. 7 and 8A.

Figure 7:
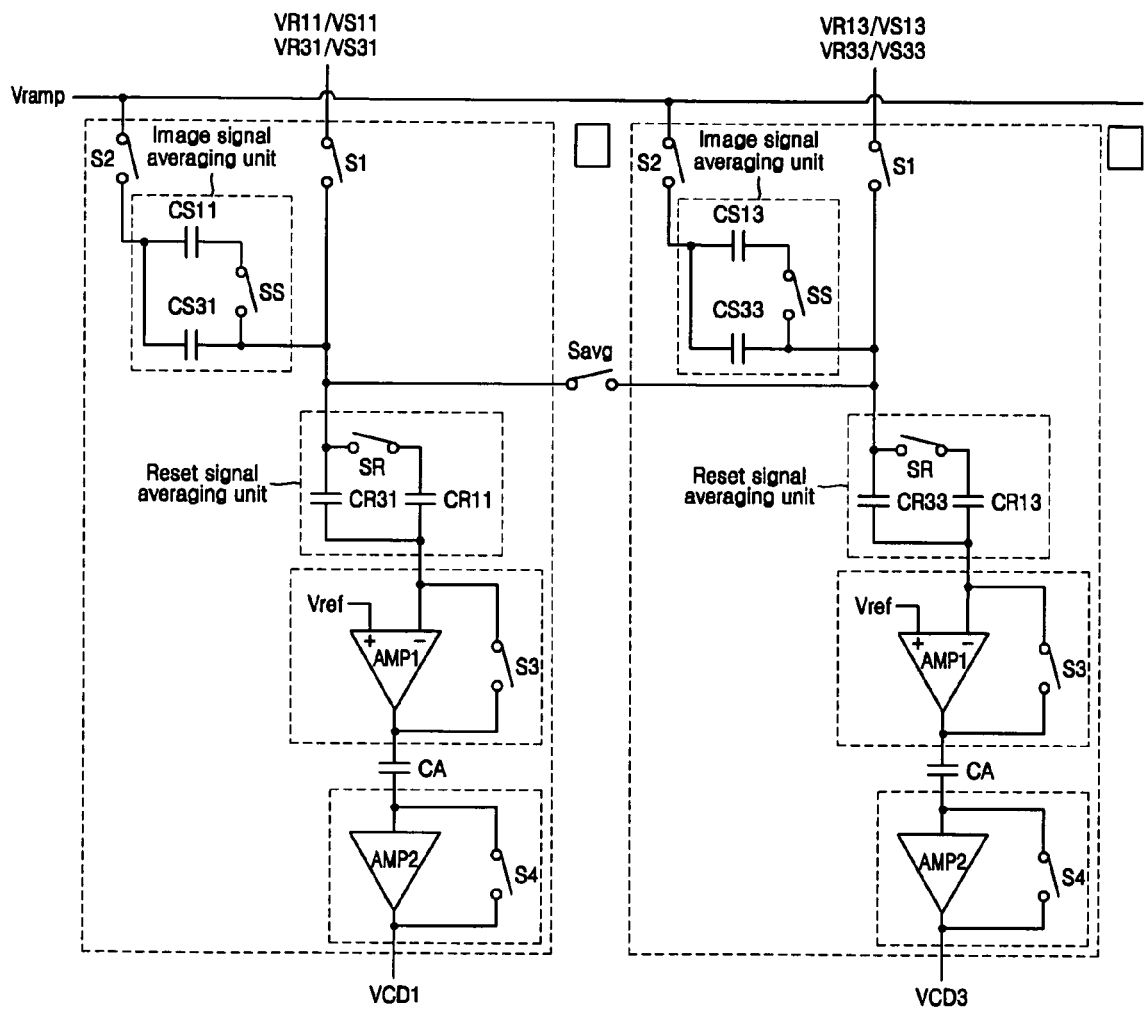
FIG. 7 is a circuit diagram illustrating in detail two switchably interconnected Averaging & Comparing Units (ACU) in the CMOS image sensor (CIS) of FIG. 3.

FIG. 7 is a detailed circuit diagram illustrating two switchably interconnected Averaging & Comparing units (ACUs) in the CMOS image sensor (CIS) of FIG. 3. FIG. 8A is a timing diagram illustrating waveforms of switching signals and of row-SELection signals used with ACUs during Correlated Double Sub-Sampling in the CMOS image sensor (CIS) of FIG. 3.

Each of the ACUs (e.g., ACU-1, ACU-2, ACU-3) in the Averaging & Comparing circuit (of FIG. 3) is switchably connected (via a vertical transmission line) to all of the pixels in a particular row through each pixel's respective $T_{SEL}$ switch. Thus, ACU-1 is operatively connected to each pixel in a first column (column 1) of pixels, including pixels R11 and R31. Likewise, ACU-3 is operatively connected to each pixel in a third column (column 3) of pixels, including R13 and R33. In general, each pixel in each column of the APS array is operatively connected to a vertical transmission line (through its respective $T_{SEL}$ switch) and to one Averaging and Comparing Unit (ACU). During operation, one pixel in each column of the APS array is activated by a row-SELect control signal via a (horizontal) line connected to all the pixels in one row of the APS array. If W is the (integer) number of pixels in a row of the APS array, then W will also be the number of ACUs in the Averaging & Comparing circuit. (In alternative embodiments of the invention, more than W ACUs (e.g., 2W) might be switchably connected to service W columns.) Thus as previously noted, during operation, all ACUs, including ACU-1 and ACU-3 will simultaneously receive analog pixel data from the pixels disposed in the same row of the APS array.

Figure 8A:
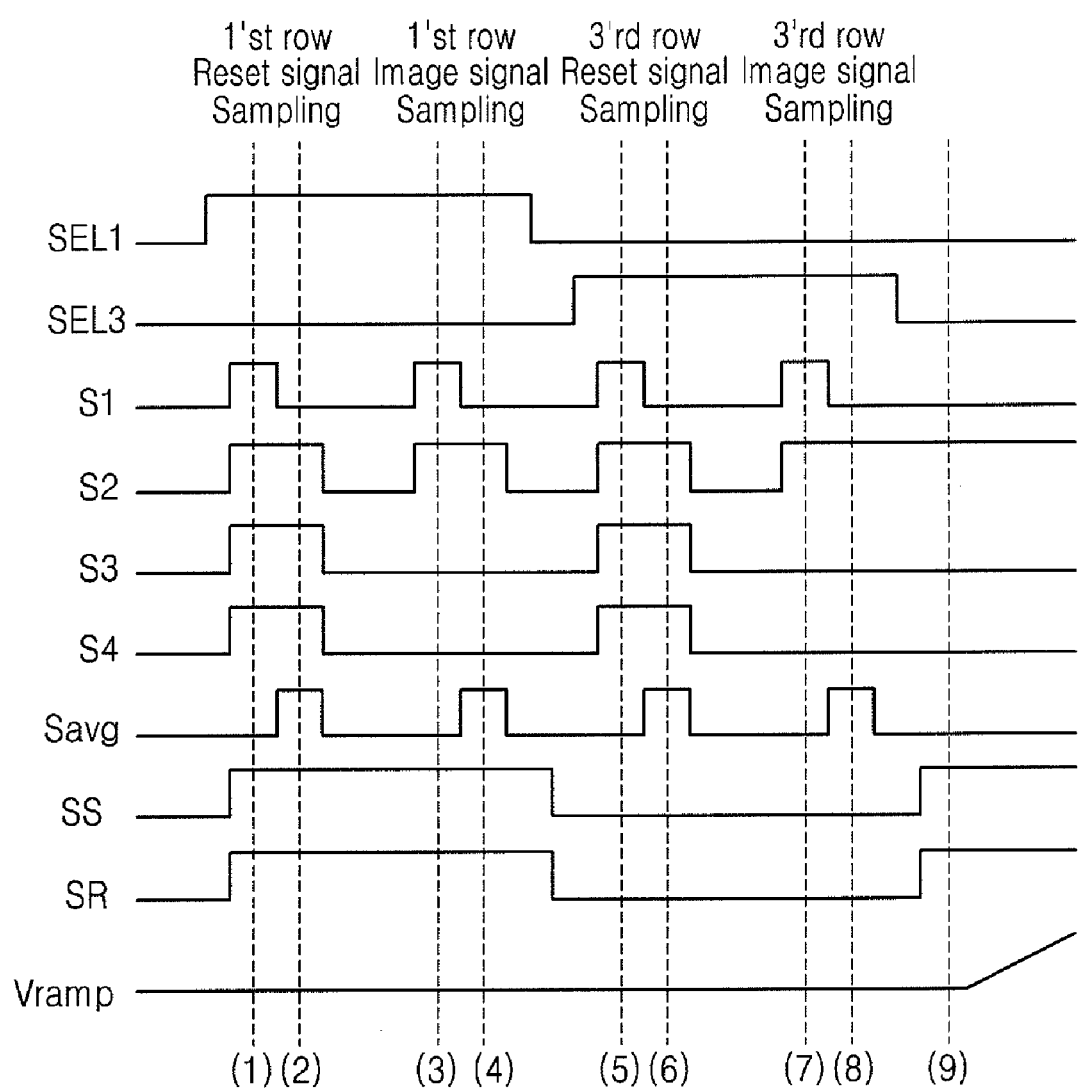
FIG. 8A is a timing diagram illustrating waveforms of switching signals and of row-SELection signals used during Correlated Double Sub-Sampling in the CMOS image sensor (CIS) of FIG. 3.

As indicated in FIG. 8A, row 1 is first activated (by SEL1) and next row 3 is activated (by SEL3). Thus, during operation, ACU-1 and ACU-3 together capture (and store) analog pixel data, including both "reset" voltages and "image signal" voltages" from each of four pixels of the same color, (e.g., R11, R31, R13, and R33). Because ACU-1 and ACU-3 are connected by switch Savg, ACU-1 and ACU-3 can share analog pixel data obtained from the four pixels of the same color, (e.g., R11, R31, R13, and R33). Specifically, ACU-1 and ACU-3 are adapted to combine and divide (average, subsample) each type ("reset" and "image signal") pixel data obtained from the four pixels of the same color, to produce an "averaged" value of the "reset" charge/voltage VR and an "averaged" value of the "image signal" charge/voltage VS. Each ACU (e.g., ACU-1 and ACU-3) is further adapted to "subtract" the "averaged" value of-the "reset" charge/voltage from the "averaged" value of the "image signal" charge/voltage to output a final analog pixel data representing the precise mathematical average of the four pixels after being CDS-sampled to remove static fixed pattern noise (FPN).

Each of the ACUs includes an analog subtractor (e.g., Subtractor-1 and Subtractor-3), and an amplifier AMP1 for receiving and transmitting the output of the analog subtractor. The amplifier AMP1 may be implemented as a non-inverting buffer (i.e., Vref=0) or, as in the preferred embodiment as a differential amplifier tied to a reference voltage Vref used in connection with subsequent parallel analog-to-digital conversion (ADC). This arrangement permits the bias source (Vramp) to be at a first voltage level during the averaging operation and at a second voltage level during the ADC operation, the first voltage level being different from the second voltage level. Buffer capacitor (CA) and a second output amplifier AMP2 are optional, and are included in the preferred exemplary embodiments (shown in FIG. 7) to increase gain for resolution of ADC. The output of the analog-domain subtractor within each ACU (e.g., ACU-1 or ACU-3) is sensed by amplifier 1 and buffered by optional capacitor CA and further amplified, for analog-to-digital conversion, by optional second amplifier AMP2, for output as a voltage signal (e.g., VCD1 or VCD3) representing an averaged VS−VR.

Each analog-domain subtractor (e.g., Subtractor-1) in the preferred exemplary embodiments includes, and may consist essentially of, a plurality of data storage capacitors (e.g., CS11, CS31, CR11, CR31 in ACU-1) connected to each other at one common node that is on the vertical transmission line connected to the pixels in the column served by the ACU (e.g., pixels in column 1 are served by ACU-1) through a switch S1. Each of the four data storage capacitors within each ACU is filled with and stores a predetermined analog pixel data charge (e.g., "reset" or "signal" data) received from one of the pixels (e.g., from a pixel in a first row, or from a third row, of the same column) connected to the ACU (e.g., ACU-1) as determined by the sequence of switched connections made through a plurality of switches (e.g., S1, S2, S3, S4, SS, SR). The corresponding switches (e.g., S1, S2, SS, SR, S3, S4) in every ACU (and between ACUs, e.g., Savg) are opened or closed simultaneously. The switches in each ACU (e.g., S1, S2, SS, SR, S3, S4) are opened or closed in coordination with each other and in coordination with the row SELection signals (e.g., SEL), as indicated in timing diagram FIG. 8A.

By manipulating the switches S1, S2, S3, S4, SS and SR, controlling connections between the pixels, the four storage capacitors (e.g., CS11, CS31, CR11, CR31) and other current paths, the four storage capacitors may be filled with analog pixel data in the following sequence: storage capacitor CR11 stores the "Reset" charge from pixel R11 (column 1, row 1); storage capacitor CS11 stores the "Signal" charge from pixel R11 (column 1, row 1); storage capacitor CR31 stores the "Reset" charge from pixel R31 (column 1, row 3); storage capacitor CS31 stores the "Signal" charge from pixel R31 (column 1, row 3).

Alternatively, during a non-CDSS mode (e.g., during a standard CDS mode) of the ACUs, one of the CR "reset" data storage capacitors (e.g., CR11 or CR31; or CR11 and CR31 effectively combined into one capacitor) and then one of the CS "signal" data storage capacitors (e.g., CS11 or CS31; or CS11 and CS31 effectively combined into one capacitor) in each ACU (each of ACU-1 and ACU-3) will be loaded with analog pixel data received from one pixel. Thus the plurality of ACUs will be loaded with (and store) complete "reset" and "signal" analog pixel data from only one row of pixels. During this method of loading the data storage capacitors (CR and CS) within the ACUs, the standard (non-subsampled) correlated double sampling (CDS) may be simultaneously performed upon all pixels in a single row (e.g., first row) of the APS array (e.g., upon pixels R11, G12, R13, G14 . . . ). Next, based upon which row SELection line is activated, the next operation of the ACUs (during non-CDSS mode) may be the performance of standard (non-subsampled) correlated double sampling (CDS) upon all pixels in a single row (e.g., a second row) of the APS array (e.g., upon pixels G21, B22, G23, B24 . . . ). During a non-CDSS mode (e.g., during a standard CDS mode) of the ACUs, the switches SS, SR, and Savg do not need to be operated (e.g., can remain open).

During the CDSS (subsampling) mode of operating the ACUs, once the eight storage capacitors in a switchably connected pair of ACUs (e.g., ACU-1 and ACU-3) are filled with analog ("reset" and "signal") pixel data from the four pixels R11, R31, R13, R33, the switches SS, SR and Savg (in coordination with switches S1, S2, S3, S4) may be sequentially closed for "averaging" together (combining and dividing) all four charges of pixel data of the same type ("reset" or "signal") received from the four pixels (R11, R31, R13, R33).

However, in a preferred embodiment of the method of CDSS operation of the ACUs (CDSS subsampling mode), analog pixel data of each type ("reset" or "signal") is "averaged" (combined and divided) between corresponding data storage capacitors of switchably connected ACUs (of different columns, e.g., columns 1 and 3) through and by closing averaging switch Savg, (e.g., even before all the data storage capacitors have been loaded with analog pixel data). Thus, for example, while data storage capacitor CS11 is being loaded with "Signal" data from pixel R11, data storage capacitor CR11 (and data storage capacitor CR13) will be storing the "average" of the "Reset" data of pixel R11 and the "Reset" data of pixel R13, instead of storing only the "Reset" value of pixel R11.

The method of operation of the switches, particularly averaging switch Savg, to perform averaging during the course of loading the four storage capacitors in each ACU, is shown in timing diagram FIG. 8A, wherein the High level indicates a Closed switch. Essentially, switch S1 is closed (in all ACUs) for loading a corresponding set of data storage capacitors e.g., CR11, CR12 (not shown), CR13, CR14 (not shown), with a predetermined type of analog pixel data (e.g., "reset") from a pixel in a row determined by activated the row SELection line (e.g., SELL for row 1) and then switch S1 is opened, and then averaging switch Savg is closed. (Meanwhile, switches S2, S3, S4, SS, and SR are opened or closed in all ACUs based upon which of the four data storage capacitors each ACU has been predetermined to receive that particular analog pixel data).

For example, see in FIG. 8A that at time (1) switch S1 is closed (for loading "reset" data into capacitors CR11 and CR 13) while averaging switch Savg is open. Next, at time (2), switch S1 is opened (following completion of loading of capacitors CR11 and CR13 with "reset" pixel data) and averaging switch Savg is closed for combining and dividing the analog pixel data (charges) that was immediately previously stored into capacitors CR11 and CR13. Thus, after analog pixel data (e.g., "reset" data) has been received by each of the selected data storage capacitor in all the ACUs (e.g., CR11, CR12, CR13, CR14 . . . ), switch S1 is opened (indicating completion of the loading of the data storage capacitors), and then the averaging switch Savg between ACUs is closed to average together (combine and divide) the corresponding charges of the same type, from pixels of the same color and in the same row of pixels (e.g., "Reset" charges from pixels R11 and R13). Thus, the analog pixel data of the same type (e.g., "reset") received from two pixels of the same color in the same row, is averaged (combined and divided) into and stored in each of the predetermined pair of data storage capacitors (e.g., in CR11 and CR13). This general same-row averaging methodology (switch Si is closed while switch Savg is open, e.g., at times (3), (5), and (7); and next switch S1 is open while switch Savg is closed, e.g., at times (4), (6) and (8)) is repeated for loading each of the remaining three pairs of data storage capacitors (e.g., CS11 and CS13, then CR31 and CR33, and then CS31 and CS33) so that each of the four corresponding pairs of data storage capacitors in switchably connected ACUs (e.g., in ACU-1 and ACU-3) will contain an "averaged" value of "reset" or "signal" data received from two pixels of the same color in the same row.

Next, an operation for same-column averaging (combining and dividing) of pixel data of the same type received from pixels of the same-column (from pixels of different rows) is performed. The same-column "averaging" (combining and dividing) of data from pixels of different rows (same-column) is simply performed by closing switches SS (e.g., at time (9)) to equalize "signal" data charges stored in the pair of CS data storage capacitors within each ACU (e.g., CS11 and CS31 in ACU-1) and closing switches SR to equalize "reset" data charges stored in the pair of CR data storage capacitors within each ACU (e.g., CR11 and CR31 in ACU-1). Upon this final same-column "averaging" step, each of the four CS data storage capacitors (e.g., CS11, CS13, CS31, CS33) in the switchably connected ACUs (e.g., ACU-1 and ACU-3) holds the same averaged "signal" charge which represents the precise mathematical average of the four (signal) charges received from four pixels of the same color (e.g., R11, R13, R31, and R33). And, similarly, upon this final (same-column) "averaging" step, each of the four CR data storage capacitors (e.g., CR11, CR13, CR31, CR33) in the switchably connected ACUs (e.g., ACU-1 and ACU-3) holds the same "averaged" "reset" charge which represents the precise mathematical average of the four (reset) charges received from four pixels of the same color (e.g., R11, R13, R31, and R33).

The data-loading and "averaging" operations among the eight data storage capacitors (CR11, CR13, CR31, CR33; and CS11, CS13, CS31, and CS33) in the two switchably connected ACUs in Correlated Double Sub-Sampling mode (for performing CDSS upon pixels R11, R13, R31 and R33) are explained in greater detail with reference to the following equations denoting charges at the times ((1) through (9)) indicated in timing diagram FIG. 8A. In these equations, Q denotes a charge in the subscripted data storage capacitor, and the "=" sign denotes an equalization of charges assuming that capacitances (of all data storage capacitors of the same type, CS or CR) are equal; The notation of voltages in the subscripted form, e.g. $V_{RESET11}$, denotes the same as voltage "VR11"; The notation about capacitance in the subscripted form, e.g., $C_{CR11/CR31}$, denotes that the subscripted capacitors (CR11 and CR31 in this example) have been effectively, albeit temporarily, connected in parallel (to form an additively combined capacitance):

At time (1), the "reset" voltages (VR11 and VR13) of pixels R11 and R13 respectively are being sampled and loaded into data storage capacitors CR11 and CR13 respectively:

R11 pixel: $Q_{CR11} = Q_{CR31} = C_{CR11/CR31}(V_{RESET11} - V_{ref})$,

R13 pixel: $Q_{CR13} = Q_{CR33} = C_{CR13/CR33}(V_{RESET13} - V_{ref})$

At this time (1), capacitors CS11, CS13, CS31, and CS33 are also being charged, but these initial charges will later be replaced with appropriate (image signal) pixel data received from predetermined pixels.

At time (2), the "reset" voltages (VR11 and VR13) of pixels R11 and R13 respectively are being "averaged" (combined and divided) between capacitors CR11 and CR13 (averaging switch Savg is closed):

$$Q_{CR11} = Q_{CR31}$$
$$= Q_{CR13} = Q_{CR33}$$
$$= C_{CR11/CR31/CR13/CR33}\left(\frac{V_{RESET11} + V_{RESET13}}{2} - V_{ref}\right)$$

At time (3), the "image" (Signal) voltages (VS11 and VS13) of pixels R11 and R13 respectively, are being sampled and loaded into data storage capacitors CS11 and CS13 respectively:

R11 pixel: $Q_{CS11} = Q_{CS31} = C_{CS11/CS31}(V_{SIGNAL11} - V_{ramp})$

R13 pixel: $Q_{CS13} = Q_{CS33} = C_{CS13/CS33}(V_{SIGNAL13} - V_{ramp})$

At this time (3), switches S3 and S4 are open (capacitors CR11, CR13, CR31, and CR33 for storing "reset" voltages are in a floating state), and capacitors CR11, CR13, CR31, and CR33 for storing "reset" voltages are holding their previous charges $Q_{CR11} = Q_{CR31} = Q_{CR13} = Q_{CR33}$ (see time (1) above).

At time (4), image (Signal) voltages (VS11 and VS13) of pixels R11 and R13 are being "averaged" (combined and divided) between capacitors CS11 and CS13 (averaging switch Savg is closed):

$Q_{CS11} = Q_{CS31}$ $= Q_{CS13} = Q_{CS33}$ $= C_{CS11/CS31/CS13/CS33}\left(\dfrac{V_{SIGNAL11} + V_{SIGNAL13}}{2} - V_{ramp}\right)$ At time (5), the "reset" voltages (VR31 and VR33) of pixels R31 and R33 respectively are being sampled and loaded into data storage capacitors CR31 and CR33 respectively:

R31 pixel: $Q_{CR31} = C_{CR31}(V_{RESET31} - V_{ref})$

R33 pixel: $Q_{CR33} = C_{CR33}(V_{RESET33} - V_{ref})$

At this time (5), because switch SS is open (capacitors CS11 and CS13 for storing "signal" voltages are in a floating state), and switch SR is open (capacitors CR11 and CR13 for storing "reset voltages are in a floating state), the capacitors CS11, CS13, CR11 and CR13 are holding their previous charges respectively.

At time (6), the "reset" voltages (VR31 and VR33) of pixels R31 and R33 respectively are being "averaged" (combined and divided) between capacitors CR31 and CR33 (averaging switch Savg is closed):

$Q_{CR31} = Q_{CR33} = C_{CR31/CR33}\left(\dfrac{V_{RESET31} + V_{RESET33}}{2} - V_{ref}\right)$ At time (7), the image (Signal) voltages (VS31 and VS33) of pixels R31 and R33 respectively are being sampled and loaded into data storage capacitors CS31 and CS33 respectively:

R31 pixel: $Q_{CS31} = C_{CS31}(V_{SIGAL31} - V_{ramp})$

R33 pixel: $Q_{CS33} = C_{CS33}(V_{SIGAL33} - V_{ramp})$

At time (8), the "image" (Signal) voltages (VS31 and VS33) of pixels R31 and R33 respectively are being "averaged" (combined and divided) between capacitors CR31 and CR33 (averaging switch Savg is closed):

$Q_{CS31} = Q_{CS33} = C_{CS31/CS33}\left(\dfrac{V_{SIGNAL31} + V_{SIGNAL33}}{2} - V_{ref}\right)$ At time (9), final averaging (of the four "reset" charges and of the four "signal" charges) is being performed. The two (same-row) "averaged reset" voltages stored in each ACU are being averaged (while switch SR is closed) into one "averaged reset" charge $Q_{RAVG}$; and the two (same-row) "averaged signal" voltages stored in each ACU are being averaged into one "averaged signal" charge $Q_{SAVG}$ (while switch SS is closed):

$Q_{RAVG} = Q_{CR11} = Q_{CR31} = Q_{CR13} = Q_{CR33}$;

and $Q_{RAVG} = C_{CR11/CR31/CR13/CR33}\left(\dfrac{V_{RESET11} + V_{RESET13} + V_{RESET31} + V_{RESET33}}{4} - V_{ref}\right)$ $Q_{SAVG} = Q_{CS11} = Q_{CS31} = Q_{CS13} = Q_{CS33}$;

And $Q_{SAVG} = C_{CS11/CS31/CS13/CS33}\left(\dfrac{V_{SIGNAL11} + V_{SIGNAL13} + V_{SIGNAL31} + V_{SIGNAL33}}{4} - V_{ref}\right)$ Thus, the final "averaged" and sub-sampled "voltage difference" (VS–VR) of the four pixels of the same color, is obtained (e.g., from $Q_{SAVG}$ and $Q_{RAVG}$) by closing SS and SR switches. After final averaging (e.g., after time (9)), charges stored in the corresponding CS and CR data storages capacitors in ACU-1 and ACU-3 of column 1 and 3 are storing the same "averaged" charges derived from four pixels. Thus, either one of outputs VCD1 or VCD3 can be used to read out (for analog-to-digital conversion) the final "voltage difference" (VS–VR) representing the four CDSS-sampled pixels of the same color.

Figure 8B:
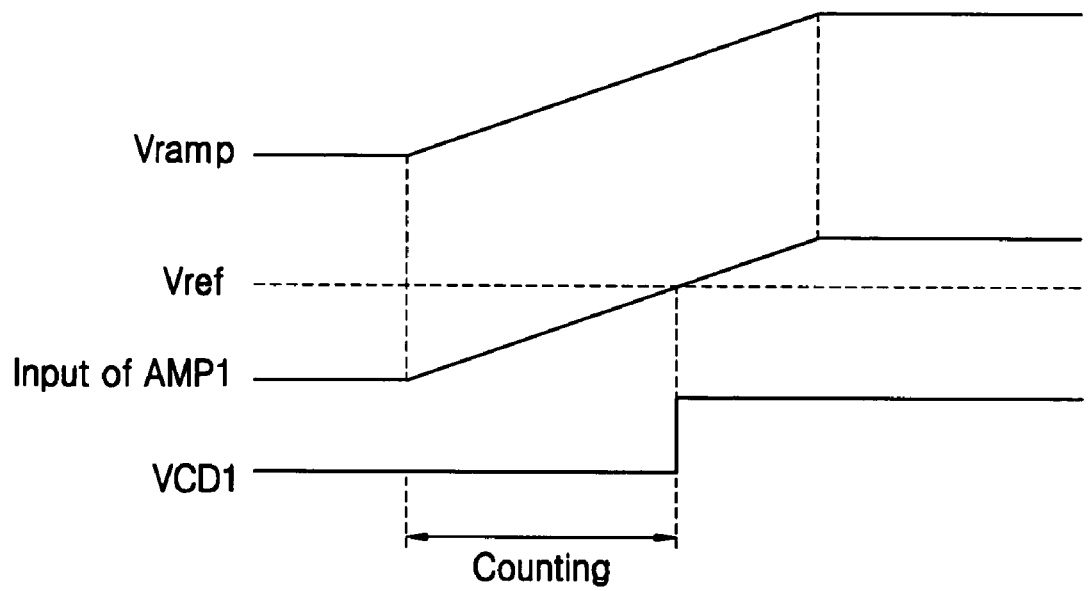
FIG. 8B is a timing diagram illustrating waveforms of a ramping voltage and a counter-latching control signal used to perform, in parallel, analog-to-digital conversions of the plurality of outputs from the plurality of Averaging & Comparing units in the CMOS image sensor (CIS) of FIG. 3.

FIG. 8B is a timing diagram illustrating waveforms of a ramping voltage and a count-latching control signal used to perform, in parallel, analog-to-digital conversions of the plurality of outputs from the plurality of Averaging & Comparing units in the CMOS image sensor (CIS) of FIG. 3. After final averaging (e.g., after time (9) noted in FIGS. 8A and 8B), "averaged reset" and "averaged signal" charges stored in the corresponding CS and CR data storages capacitors in ACU-1 and ACU-3 (of column 1 and 3) are compared using the analog-domain subtractor within the ACU (e.g., Subtactor-1 of ACU-1) to obtain the single (subsampled) value of the four CDSS-sampled pixels of the APS array. Subtractors (e.g., Subtractor-1) comprised of CS and CR capacitors connected in series are connected between Vramp and the Input of amplifier AMP1. Thus, the voltage at the input of AMP1 represents the sum of: Vramp+VS+(–VR), since the polarity of the VR charges stored on the CR capacitors are connected (in series) opposite of the polarity of VS charges stored on CS capacitors. Thus, the voltage at the Input of AMP1 is Vramp clamped higher by the (averaged) VS–VR. Counter Enable signal (CE) (see FIG. 3) may be timed to be asserted to begin a count after final averaging (after switches SS and SR are closed). Thus, by ramping up the voltage Vramp at a known (e.g., predetermined) rate, or at least a fixed rate, while at the same moment initiating the count of a counter (e.g., in the Digital signal output circuit of FIG. 3), the magnitude of VS–VR can be converted from an analog value to a quantized digital value, by latching the count when the Input of AMP1 (from the output of the subtractor) crosses a predetermined threshold voltage level, (e.g., Vref). The larger the magnitude of VS−VR, the shorter a time (count) it will take for the Input of AMP1 to reach the threshold voltage (Vref).

When the Input of AMP1 reaches the threshold voltage (Vref), the signal VCD of the ACU (e.g., VCD1 of ACU-1) will transit from a low to a high value. Thus, the VCD signal from each ACU (e.g., VCD1, VCD2, VCD3 . . . ) may be output to the Latch circuit (see FIG. 9) as a count-latch control signal.

Figure 9:
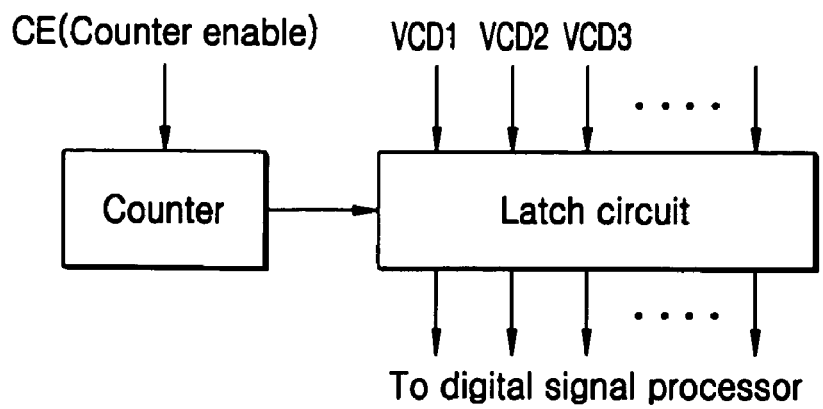
FIG. 9 is a block diagram illustrating the Counter and Latch circuit used for performing, in parallel, analog-to-digital conversions of the plurality of outputs from the plurality of Averaging & Comparing units in the CMOS image sensor (CIS) of FIG. 3.

FIG. 9 is a block diagram illustrating the Counter and Latch circuit used for performing, in parallel, analog-to-digital conversions of the plurality of outputs (VCD) from the plurality of Averaging & Comparing units (ACUs) in the CMOS image sensor (CIS) of FIG. 3. The Counter outputs a digital count beginning when Counter Enable signal (CE) is active (e.g., after "final averaging" of four pixels by the ACUs operating in a CDSS mode; or after only one pixel's data is loaded in each of the ACUs during standard CDS mode). The Latch circuit includes a plurality of parallel count-latches (one for each ACU) for latching the count output to all latches by the counter at the moment indicated by the respective VCD signal output by the respective ACU. The VCD signal output by each ACU may be used to control the respective count latch provided (in the Latch circuit) for each ACU, so that when a VCD signal (e.g., VCD1 of ACU-1) transits from a low to a high value, the respective count-latch provided for that ACU stores the count value at that (count) moment. Thus, when the counter reaches the end of its count, all the (independent) outputs from the subtractors in the plurality of ACUs shall have been analog-to-digital converted, in parallel. The contents of the plurality of latches (storing counter values for each ACU) in the Latch circuit may be output to a digital signal processor (DSP) to further refine or to store or transmit the (subsampled or non-subsampled) pixel data from the ACUs as digital pixel data.

Figure 10:
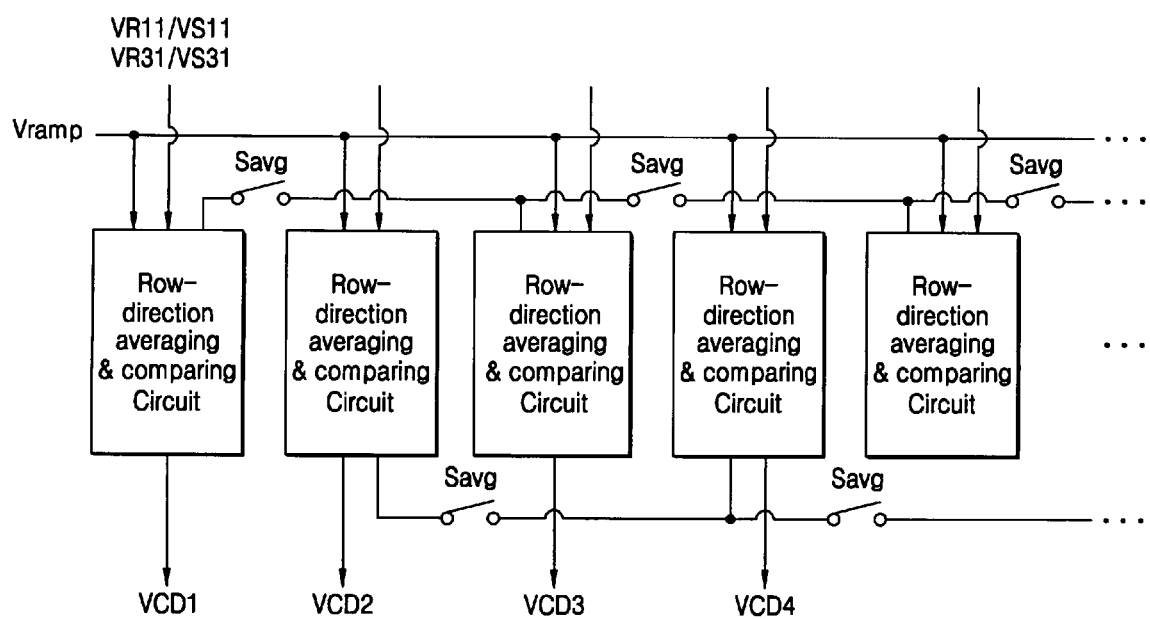
FIG. 10 is a block diagram illustrating another exemplary embodiment of switching interconnections between a plurality of Averaging & Comparing units for performing Correlated Double Sub-Sampling (CDSS), for averaging/subsampling up $N^2$ pixels (at a subsampling ratio greater than 4) in the APS array of the CMOS image sensor (CIS) of FIG. 3.

FIG. 10 is a block diagram illustrating another exemplary embodiment of switching interconnections between a plurality of Averaging & Comparing units for performing Correlated Double Sub-Sampling (CDSS), for averaging/subsampling up to $N^2$ pixels (e.g., at a subsampling ratio greater than 4) in the APS array of the CMOS image sensor (CIS) of FIG. 3. Averaging and Comparing Circuit (see FIG. 3) of FIG. 10 is similar to that of FIG. 6, except that the switching interconnections between the plurality of Averaging & Comparing Units (NACUs) is more flexible in FIG. 10 in that more than two (e.g., N) ACUs of different columns can be connected at a time. This increased interconnectivity supports the averaging "combining and dividing" of charges (e.g., reset and signal) of pixels from more than two columns as in the case of the pairs of ACUs connected in FIG. 6. Thus, by connecting together N NACUs (instead of 2 ACUs), each containing N CR data storage capacitors and N CS data storage capacitors (instead of only 2 CR data storage capacitors and 2 CS data storage capacitors), a Bayer-pattern pixel region of dimensions 2N×2N can be subsampled down to data representing the three colors (RGB) of one "averaged" pixel. Thus, the interconnection system of FIG. 10 supports Correlated Double Sub-Sampling (CDSS) of a 2N×2N pixel region in the CMOS image sensor (CIS) of FIG. 3, where N may range from 1 (no subsampling) to any integer (e.g. 2 as in the case of the circuits of FIGS. 6 & 7).

Figure 11:
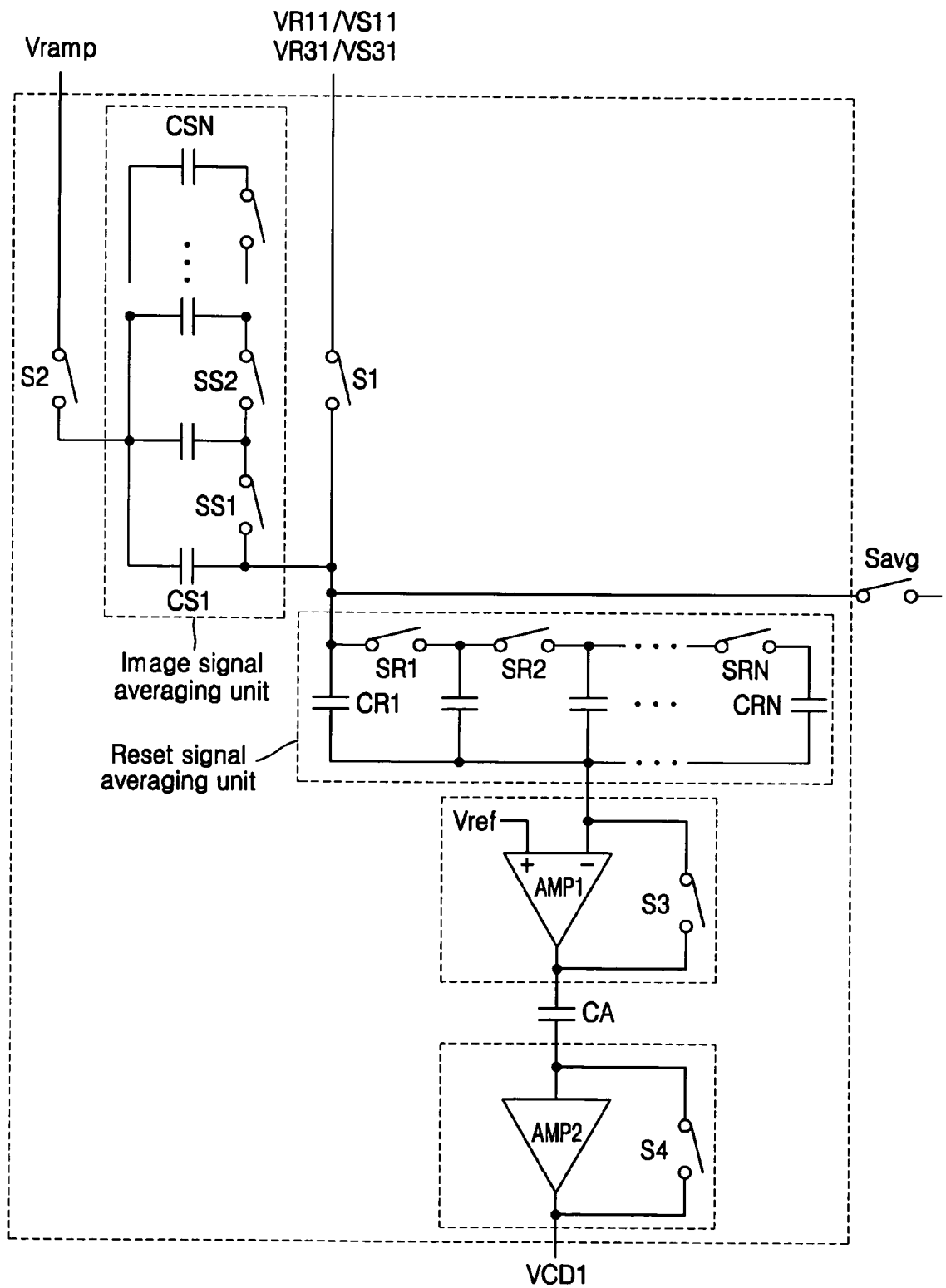
FIG. 11 is a circuit diagram illustrating in detail an Averaging & Comparing Unit for averaging/subsampling up to $N^2$ pixels in the APS array of the CMOS image sensor (CIS) of FIG. 3, according to another embodiment of the invention.

FIG. 11 is a circuit diagram illustrating in detail an enhanced Averaging & Comparing Unit (NACU) for CDSS averaging/subsampling up to $N^2$ pixels of the same color in a 2N×2N pixel region in the APS array of the CMOS image sensor (CIS) of FIG. 3, according to another embodiment of the invention. The NACU depicted in FIG. 11 is similar to the ACU depicted in FIG. 7 except that the analog-domain subtractor in the NACU of FIG. 11 includes 2N analog pixel data storage capacitors (e.g., 2N=6, 8, 10), instead of only 4 analog pixel data storage capacitors, (and additional switches, e.g., SSN). The additional data storage capacitors (and additional switches to control their loading and averaging) support the CDSS mode averaging/subsampling of $N^2$ pixels of the same color disposed in N different columns and in different N rows within a 2N×2N pixel region of the APS array. The CR (reset) data storage capacitors within the subtractor (e.g., NSubtractor-1) of an NACU are charged (loaded) from CRN to CR1 with (reset) voltages (VR) from pixels of the column connected to the NACU. The CS (reset) data storage capacitors within the subtractor (e.g., NSubtractor-1) of an NACU are charged (loaded) from CSN to CS1 with (image signal) voltages (VS) from the same pixels of the column connected to the NACU.

Because there is required one NACU for each column of pixels to be CDSS averaged/subsampled, the NACU of FIG. 11 would be switchably interconnected with at least N−1 other similar NACUs, e.g., in the manner indicated in FIG. 10. In practice, because the NACU of FIG. 11 can also perform CDSS averaging/subsampling of 1, 2, 3 or any lesser integer number L of pixels (less than N pixels, e.g., L=1, 2, 3) disposed in its column, all of every-other (e.g., odd) NACUs in the CIS may be switchably interconnected in the manner indicated by FIG. 10. However, each "averaging" switch Savg may be controlled independently, or dynamically, so as to disallow "averaging" connections between NACUs in a first block of every-other (e.g. odd) NACUs (containing L odd NACUs) and NACUs in an adjacent second block of every-other (e.g. odd) ACUs (containing another L odd ACUs). In that manner, only pixels from the same 2N×2N (or 2L×2L) pixel region shall be averaged together during CDSS mode operation of each block of L or N switchably interconnected NACUs.

By dynamically controlling the switches Savg, S1, S2, S3, S4, and (SS1, SS2 . . . SSN) and (SR1, SR2, . . . SRN), the NACUs of this embodiment can be employed to perform subsampling of a dynamically selected number $L^2$ (down to $1^2$ and up to $N^2$) of pixels of the same color disposed in square (or non-square shaped) pixel region.

As described above, at least one embodiment of the present invention provides a method and apparatus for performing Correlated Double Sub-Sampling (CDSS) that includes steps of "averaging" (in the analog domain) the "reset" values and averaging (in the analog domain) the "signal" values, received from a plurality of pixels, followed by the step of subtracting (in the analog domain) the "averaged" reset value from the "averaged" signal value, to generate an CDSS-sampled analog data value representing the precise mathematical average of four conventionally CDS-sampled pixels of the same color. Thus, the at least one embodiment of the present invention provides the capability of directly and precisely subsampling a plurality of pixels in an active pixel sensor (APS) array in the analog domain while also removing static fixed pattern noise (FPN).

Having thus described exemplary embodiments of the present invention, it is to be understood that the invention defined by the appended claims is not to be limited by particular details set forth in the above description of exemplary embodiments as many apparent variations thereof are possible without departing from the spirit or scope of the invention as hereafter claimed. In the following claims, L and N denote integer numbers, where L ranges from 1 to N inclusive; and "Nth" denotes the number N; 2N denotes twice N; and "2Nth" denotes twice N.

What is claimed is:

1. An image sensor comprising a plurality of pixels arranged in rows and columns, each column of pixels being switchably connected to at least two reset charge storage capacitors for storing at least two reset charges and to at least two image signal charge storage capacitors for storing at least two image signal charges, wherein at least one of the at least two reset charge storage capacitors in each column is configured to be connected at a node in series to at least one of the at least two image signal charge storage capacitors in the same column,
wherein at least two reset charge storage capacitors are switchably connected to each other to generate an averaged reset charge for at least two pixels in the same column.

2. The image sensor according to claim 1, further including a switch connected between the nodes corresponding to two different columns of pixels.

3. The image sensor according to claim 2, wherein the switch is configured to alternately perform a first averaging operation using at least two reset charges from the two different columns to generate an averaged reset charge and a second averaging operation using at least two image charges from the two different columns to generate an averaged image signal charge.

4. The image sensor according to claim 3, wherein the first and second averaging operations are sequentially performed in the analog domain.

5. The image sensor according to claim 3, further including an analog subtractor, for subtracting a first voltage corresponding to an averaged reset charge from a second voltage corresponding to an averaged image signal charge to generate an averaged pixel data voltage stored in a capacitance.

6. The image sensor according to claim 5, further including an analog to digital converter (ADC) including a counter for carrying out analog to digital conversion of the averaged pixel data voltage.

7. The image sensor according to claim 6, wherein the capacitance storing the averaged pixel data voltage is switchably connected between a bias voltage source and the ADC.

8. The image sensor according to claim 7, wherein the bias voltage source is at a first voltage level during the first and second averaging operations and ramped up towards a second voltage level during the ADC operation.

9. The image sensor according to claim 3, further comprising an averaging circuit including the switch connected between two nodes corresponding to two different columns.

10. The image sensor according to claim 1, wherein the at least two reset charge storage capacitors in each column are configured to be switchably connected in parallel with each other and wherein the at least two image signal charge storage capacitors in each column are configured to be switchably connected in parallel with each other.

11. The image sensor according to claim 1, wherein one of the at least two reset charge storage capacitors in a first column and one of the at least two image signal charge storage capacitors in the first column are connected to each other at the node without a switch being disposed between them.

12. The image sensor according to claim 1, wherein the at least two reset charge storage capacitors in each column comprise four reset charge storage capacitors, and wherein the at least, two image signal charge storage capacitors in each column comprise four image signal charge storage capacitors, and wherein only three of the four reset charge storage capacitors are connected to the node through sample-holding switches, and wherein only three of the four image signal charge storage capacitors in each column are connected to the node through sample-holding switches.

13. The image sensor according to claim 1, wherein a sample-holding switch is disposed between the node and each of all of the at least two reset charge storage capacitors in a first column; and
wherein a sample-holding switch is disposed between the node and each of all of the at least two image signal charge storage capacitors in the first column.

14. The image sensor of claim 1, wherein at least two image signal charge storage capacitors are switchably connected to each other to generate an averaged image signal charge for at least two pixels in the same column.

15. A method of subsampling $N^2$ pixels in an active pixel sensor (APS) array, the method comprising: sequentially storing into N reset charge storage capacitors N pixel reset charges received from N pixels in the same first column of the APS array, wherein the N reset charge storage capacitors are switchably connected to each other in parallel between a first node and a second node; and
closing no more than N−1 reset charge-holding switches connected to the N reset charge storage capacitors between the first node and the second node; and
closing a row-direction averaging switch disposed between the first node and a second set of N reset charge storage capacitors N corresponding to a second column of the APS array,
wherein the N reset charge storage capacitors are connected to each other in parallel when the N−1 reset charge-holding switches are closed, such that an averaged reset charge for N pixels in the first column in generated.

16. The method of claim 15, further comprising combining the pixel reset charges stored in the first and second capacitors among the N reset charge storage capacitors by connecting the first and second reset charge storage capacitors in parallel to each other.

17. The method of claim 15, further comprising combining pixel signal charges stored in the first and second capacitors among a set of N image signal charge storage capacitors.

18. The method of claim 17, wherein combining the pixel signal charges stored in the first and second image signal charge storage capacitors includes connecting the first and second image signal charge storage capacitors in parallel to each other.

19. The method of claim 16, further comprising storing in third and fourth capacitors among the set of reset charge storage capacitors third and fourth pixel reset charges respectively received from third and fourth pixels in a second row and in the first and second columns of the APS array, wherein storing the pixel reset charge from the third pixel in the third reset charge storage capacitor includes the substeps of:
receiving in each of the first and third reset charge storage capacitors the pixel reset charge from the first pixel; and afterwards
opening a holding switch connected to the first reset charge storage capacitor to hold in the first reset charge storage capacitor the pixel reset charge received from the first pixel; and afterwards
receiving in the third reset charge storage capacitor the pixel reset charge from the third pixel.

20. The method of claim 19, further comprising combining the pixel reset charges stored in the third and fourth reset charge storage capacitors before opening the holding switch connected to the first reset charge storage capacitor.

21. The method of claim 19, further comprising:
further comprising storing in third and fourth capacitors among the set of signal charge storage capacitors third and fourth pixel signal charges respectively received from the third and fourth pixels; and
combining the pixel signal charges stored in the third and fourth signal charge storage capacitor.

22. The method of claim 21, further including a subtraction operation in the analog domain wherein a difference voltage is obtained by connecting the first signal charge storage capacitor in series with the first reset charge storage capacitor.

23. The method of claim 22, further including performing an analog to digital conversion (ADC) of the difference voltage.

24. The method of claim 22, further comprising performing an analog to digital conversion (ADC) by ramping up a bias voltage connected to the series-connected first signal charge storage capacitor and first reset charge storage capacitor.

25. The method of claim 24, wherein the bias source is at a low voltage level during the receiving of charges in the storage capacitors and is ramped upwards towards a high voltage level during the ADC.

26. The method of claim 15, wherein the four pixels are arrayed in two rows and in two columns, and a first averaging operation includes: obtaining a first same-row average of two reset charges from a first pair of pixels in the first row, and then obtaining a second same-row average of two reset charges from a second pair of pixels in the second row; and then averaging the first same-row average with the second same-row average.

27. The method of claim 15, wherein sequentially storing into N reset charge storage capacitors N pixel reset charges includes storing in the first and second capacitors among the N reset charge storage capacitors the pixel reset charges received from the first and second pixels in the first column, and includes the substeps of:
closing a first one of the N−1 switches connected between the first node and the first capacitor;
receiving in each of the first and second capacitors the pixel reset charge from the first pixel; and afterwards opening the first one of the N−1 switches connected between the first node and the first capacitor to hold within the first capacitor the pixel reset charge received from the first pixels in the first column; and then
receiving in the second capacitor the pixel reset charge from the second pixel in the first column.

28. The method of claim 15 further comprising:
sequentially storing into N image signal charge storage capacitors N image signal charges received from N pixels in the same first column of the APS array, wherein the N image signal charge storage capacitors are switchably connected to each other in parallel between the first node and a third node; and
closing no more than N−1 image signal charge-holding switches connected to the N image signal charge storage capacitors between the first node and the third node.

29. The method of claim 15, further comprising storing in third and fourth capacitors among the set of image signal charge storage capacitors third and fourth image signal charges respectively received from third and fourth pixels in a second row and in the first and second columns of the APS array, wherein storing the image signal charge from the third pixel in the third image signal charge storage capacitor includes the substeps of:

receiving in each of the first and third image signal charge storage capacitors the image signal charge from the first pixel; and afterwards
opening a holding switch connected to the first image signal charge storage capacitor to hold in the first image signal charge storage capacitor the image signal charge received from the first pixel; and afterwards
receiving in the third image signal charge storage capacitor the image signal charge from the third pixel.

30. An image sensor comprising:
an array of pixels arranged in a plurality of rows and a plurality of columns, every pixel in each column of pixels is operatively connected to an averaging unit, wherein each averaging unit includes a first and second storage capacitors for storing reset charges from a first pixel and from a second pixel, and further includes third and fourth storage capacitors for storing analog image signal charges from the first pixel and from the second pixel, wherein at least one of the at least two reset charge storage capacitors in each column is configured to be connected at a node in series to at least one of the at least two image signal charge storage capacitors in the same column,
wherein the first and second storage capacitors are switchably connected to each other to generate an averaged reset charge for the first and second pixels in the same column.

31. The image sensor of claim 30, further comprising a first averaging switch configured to combine the reset charges stored in at least two averaging units.

32. The image sensor of claim 31, wherein the first averaging switch is further configured to combine the image signal charges stored in the same at least two averaging units.

33. The image sensor of claim 30, wherein each averaging unit further includes: an Nth storage capacitor for storing image signal charge from an Nth pixel and a 2Nth storage capacitor for storing analog reset data charge from the Nth pixel.

34. The image sensor of claim 30, further comprising an analog to digital converter (ADC) for each column, for carrying out analog to digital conversion of the plurality of outputs from the averaging units.

35. The image sensor of claim 34, wherein each analog to digital convener (ADC) is adapted to perform in-parallel the analog to digital conversion of the output from one of the averaging units.

36. The image sensor of claim 30, wherein each averaging unit is connected between a bias voltage source and an input of its corresponding ADC.

37. The image sensor of claim 30, wherein the bias voltage source is at a first voltage level during the averaging unit's operation and ramps up towards a second voltage level during the ADC operation, the first voltage level being different from the second voltage level.

38. The image sensor of claim 30, wherein each averaging unit further includes a reset column-averaging switch disposed between the first and second storage capacitors for averaging reset charges from pixels in the same column.

39. The image sensor of claim 30, wherein each averaging unit further includes an image signal column-averaging switch disposed between the third and fourth storage capacitors for averaging image signal charges from pixels in the same column.

40. The image sensor of claim 30, wherein the third and fourth storage capacitors are switchably connected to each other to generate an averaged image signal charge for the first and second pixels in the same column.

41. A method of subsampling $N^2$ pixels in an array of pixels arranged in a plurality of rows and a plurality of columns, each pixel being adapted to output a reset voltage and an image signal voltage, the method comprising the steps of:

storing the plurality of reset voltages output from the $N^2$ pixels into a first set of storage capacitors and combining the plurality of reset voltages stored in the first set of storage capacitors;

storing a plurality of image signal voltages output from the plurality of $N^2$ pixels into a second set of storage capacitors and combining the plurality of image signal voltages stored in the second set of storage capacitors; and connecting at least one storage capacitor among the first set of storage capacitors in-series with at least one storage capacitor among the second set of storage capacitors, wherein the storage capacitors in the first set are switchably connected to each other to generate an averaged reset charge for the plurality of pixels in the same column.

42. The method of claim 41, further comprising, detecting the voltage across the series-connected storage capacitors among the first and second sets of storage capacitors.

43. The method of claim 41, further comprising, digitally quantizing the voltage across the series-connected storage capacitors among the first and second sets of storage capacitors.

44. The method of claim 41, wherein the storage capacitors in the second set are switchably connected to each other to generate an averaged image signal charge for the plurality of pixels in a same column.

45. A method of subsampling $N^2$ pixels arrayed in N columns and N rows of an active pixel sensor (APS) array, each pixel being adapted to output a reset voltage and an image signal voltage, the method comprising the steps of:

storing the reset voltage of the first pixel in the first row as a first charge in a first capacitor and storing the reset voltage of the second pixel in the first row as a second charge in a second capacitor; and then immediately combining the first and second charges into a first row-averaged reset charge; and afterwards storing the reset voltage of the first pixel in the second row as a fifth charge in a fifth capacitor and storing the reset voltage of the second pixel in the second row as a sixth charge in a sixth capacitor; and then immediately combining the fifth and sixth charges into a second row-averaged reset charge; and combining the first row-averaged reset charge and the second row-averaged reset charge into a subsampled reset charge, wherein the first and fifth capacitors are switchably connected to each other to generate an averaged reset charge for the pixels of the first and second rows in the same column.

46. The method of claim 45, storing the reset voltage of the first pixel in the first row as a first charge in a first capacitor includes the substeps of:

receiving in each of the first and fifth capacitors the reset voltage from the first pixel in the first row and opening a switch connected to the first capacitor to hold in the first capacitor the reset voltage received from the first pixel in the first row; and and storing the reset voltage of the first pixel in the second row as a fifth charge in a fifth capacitor includes keeping open the switch connected to the first capacitor and receiving in the fifth capacitor the reset voltage from the first pixel in the second row.

* * * * *